US009122786B2

(12) United States Patent
Cammert et al.

(10) Patent No.: US 9,122,786 B2
(45) Date of Patent: Sep. 1, 2015

(54) SYSTEMS AND/OR METHODS FOR STATISTICAL ONLINE ANALYSIS OF LARGE AND POTENTIALLY HETEROGENEOUS DATA SETS

(75) Inventors: Michael Cammert, Wettenberg (DE); Christoph Heinz, Weimar-Niederweimar (DE); Jürgen Krämer, Marburg (DE); Tobias Riemenschneider, Schwalmstadt (DE)

(73) Assignee: SOFTWARE AG, Darmstadt (DE)

( * ) Notice: Subject to any disclaimer, the term of this patent is extended or adjusted under 35 U.S.C. 154(b) by 329 days.

(21) Appl. No.: 13/616,952

(22) Filed: Sep. 14, 2012

(65) Prior Publication Data

US 2014/0078163 A1    Mar. 20, 2014

(51) Int. Cl.
*G06F 11/34* (2006.01)
*G06F 17/30* (2006.01)

(52) U.S. Cl.
CPC ...... *G06F 11/3471* (2013.01); *G06F 17/30516* (2013.01); *G06F 2201/86* (2013.01); *G06F 2201/885* (2013.01)

(58) Field of Classification Search
None
See application file for complete search history.

(56) References Cited

U.S. PATENT DOCUMENTS

| 7,100,115 | B1 * | 8/2006 | Yennaco | 715/748 |
| 2003/0225975 | A1 * | 12/2003 | Hokenek et al. | 711/133 |
| 2006/0143389 | A1 * | 6/2006 | Kilian et al. | 711/130 |
| 2007/0294480 | A1 * | 12/2007 | Moser | 711/133 |
| 2009/0070785 | A1 * | 3/2009 | Alvez et al. | 719/318 |
| 2009/0234682 | A1 * | 9/2009 | Baggett et al. | 705/6 |
| 2010/0228954 | A1 * | 9/2010 | Frank et al. | 712/206 |
| 2010/0306786 | A1 * | 12/2010 | Passey et al. | 719/314 |
| 2013/0326034 | A1 * | 12/2013 | Shaik et al. | 709/223 |
| 2013/0346474 | A1 * | 12/2013 | Burckart et al. | 709/203 |

OTHER PUBLICATIONS

Toth et al., "Complex Event Processing Synergies with Predictive Analytics," Proceedings of the 4th ACM International Conference on Distributed Event-Based Systems, pp. 95-96, Jul. 2010.*

(Continued)

*Primary Examiner* — Maurice L McDowell, Jr.
*Assistant Examiner* — Donna J Ricks
(74) *Attorney, Agent, or Firm* — Nixon & Vanderhye PC

(57) ABSTRACT

Certain example embodiments relate to using Complex Event Processing (CEP) techniques for statistical analysis of cache behavior and parameters, e.g., in connection with large, potentially heterogeneous data sets (e.g., "Big Data"). A dedicated stream mining operator registers a listener to a cache and receives notifications on cache operations. For selected element attributes, a first model estimates the probability density functions of the attribute values, delivering well-defined estimates of the attribute value distributions. A second model analyzes the time elements stay in the cache ("validity"). Validity is combined with the attribute value distribution. A meaningful analysis model (Cache Element Model) can be derived by combining additional summary statistics for the validity with the attribute value distribution, describing how long elements stay in the cache for attribute values of a specific region, and how the values are distributed. It may be used to inform administrative tasks such as, optimization of cache parameters.

27 Claims, 4 Drawing Sheets

(56) References Cited

OTHER PUBLICATIONS

Dindar et al., "Efficiently Correlating Complex Events over Live and Archived Data Streams," Proceedings of the 5th ACM International Conference on Distributed Event-Based Systems, Jul. 2011.*
TIBCO BusinessEvents Extreme, Architect's Guide, Software Release 1.0.0, published May 27, 2012.*
Heinz, "Density Estimation Over Data Steams," Dissertation May 5, 2007.*
Dindar et al., Efficiently Correlating Complex Events over Live and Archived Data Streams, Proceedings of 5th ACM International Conference on Distributed Event-Based Systems, Jul. 2011.*
Drools Fusion User Guide (retrieved Sep. 13, 2012) http:docs.jboss.org/drools/release/5.2.0.CR1/drools-fusion-docs/html_single/.*
Oracle—Using Oracle Complex Event Processing Caching [retrieved Sep. 11, 2012]. http://docs.oracle.com/cd/E13213_01/wlevs/docs30/create_apps/cache.html.
TIBCO BusinessEvents Extreme, Architect's Guide, published May 27, 2012 [retrieved Sep. 11, 2012]. https://docs.tibco.com/pub/businessevents-extreme/bex-1.0.0-may12/doc/pdf/tib_bex_architects_guide.pdf.
CETAS—Products [retrieved Sep. 12, 2012]. http://www.cetas.net/products.php.
CETAS—Big Data Analytics [retrieved Sep. 12, 2012]. http://www.cetas.net/.
Welcome to CETAS Blog! "Four Key Data Mining Tasks to Extract Insights from Big Data—Part 1 of 5," May 29, 2012 [retrieved Sep. 12, 2012]. http://03240c9.netsolhost.com/blog/2012/05/29/four-key-data-mining-tasks-to-extract-insights-from-big-data/.
Welcome to CETAS Blog! "Four Key Data Mining Tasks to Extract Insights from Big Data—Part 2 of 5," Jun. 1, 2012 [retrieved Sep. 12, 2012]. http://03240c9.netsolhost.com/blog/2012/06/01/four-key-data-mining-tasks-to-extract-insights-from-big-data-part-2-of-5-associationlink-analysis/.
IBM—Optio [retrieved Sep. 12, 2012]. http://www-304.ibm.com/partnerworld/gsd/scsolutiondetails.do?solution=44705&1c=en&stateCd=P&cd=BPAS&sbcd=&page=1.
Sybase—Sap's HANA Database: Big Performance for Big Data—Infran's View [retrieved Sep. 12, 2012]. http://blogs.sybase.com/irfankhan/2012/04/sap%E2%80%99s-hana-database-big-performance-for-big-data/.
Software AG, "CeBIT: Software AG Announces its Strategy for the In-Memory Management of Big Data," Press Release Mar. 5, 2012 [retrieved Sep. 12, 2012]. http://www.softwareag.com/us/Press/pressreleases/20120305_CeBIT_2012_page.asp.
Gartner—SAP HANA 1.0 Could Help Enterprise Realize Promise of In-Memory Technology, Jun. 28, 2011 [retrieved Sep. 12, 2012]. http://www.gartner.com/id=1733615.
Lajos J. Fülöp et al., "Survey on Complex Event Processing and Predictive Analytics," Technical Report, University of Szeged, Department of Software Engineering, Jun. 13, 2010. http://www.inf.u-szeged.hu/~beszedes/research/cep_pa_tech2010.pdf.
Gabriella Tóth et al., "Complex Event Processing Synergies with Predictive Analytics," Proceedings of the 4th ACM International Conference on Distributed Event-Based Systems, pp. 95-96, Jul. 2010. http://www.inf.u-szeged.hu/~beszedes/research/CEP-PA-Synergy-Poster25.pdf.
Nihal Dindar et al., "Efficiently Correlating Complex Events over Live and Archived Data Streams," Proceedings of the 5th ACM International Conference on Distributed Event-Based Systems, Jul. 2011. http://www.inf.ethz.ch/personal/tatbul/publications/dejavu_debs11.pdf.
Christoph Heinz, "Density Estimation Over Data Steams," Dissertation May 5, 2007. http://archiv.ub.uni-marburg.de/diss/z2007/0139/pdf/dch.pdf.
WestGlobal—Vantify Overview [retrieved Sep. 13, 2012]. http://www.westglobal.com/vantify/overview.
Progress Software—Apama Event Processing Platform: Progress Software Overview and Key Features [retrieved Sep. 13, 2012]. http://www.progress.com/en/apama/event-processing-platform.html.
StreamBase—Streambase Complex Event Processing Platform [retrieved Sep. 13, 2012]. http://www.streambase.com/products/streambasecep/#axzz26MU8JTe3.
SQLstream—Real-time Big Data [retrieved Sep. 13, 2012]. http://www.sqlstream.com/.
ruleCore Complex Event Processing Server—Overview [retrieved Sep. 13, 2012]. http://rulecore.com/content/view/35/52/.
ruleCore Complex Event Processing Server—Features [retrieved Sep. 13, 2012]. http://rulecore.com/content/view/15/34/.
TIBCO—Complex Event Processing [retrieved Sep. 13, 2012]. http://www.tibco.com/products/event-processing/complex-event-processing/default.jsp.
SAP HANA Services E-Book [retrieved Sep. 13, 2012]. http://www.sap.com/community/ebook/2012_05_HANA_Services/en/index.html#/p./1.
Sybase—SAP Sybase Event Stream Processor Overview [retrieved Sep. 13, 2012]. http://www.sybase.com/products/financialservices-solutions/complex-event-processing.
UC4 Automation Platform—UC4 Decision: Real Time Intelligence for Just in Time Execution [retrieved Sep. 13, 2012]. http://www.uc4.com/products/uc4-automation-platform/uc4-decision.html.
UC4 Automation Platform—UC4 Insight: Pattern Mapping for Process Optimization [retrieved Sep. 13, 2012]. http://www.uc4.com/products/uc4-automation-platform/uc4-insight.html.
Event Zero Next Generation Monitoring Solutions—Event Center Provides Real-Time Operations Intelligence [retrieved Sep. 13, 2012]. http://www.greentrac.com/eventcenter/.
IBM—Lotus ActiveInsight [retrieved Sep. 13, 2012]. http://www-01.ibm.com/software/lotus/products/activeinsight/.
Cloudmeter—PION Data Collection and Stream Computing Platform Overview [retrieved Sep. 13, 2012]. http://www.cloudmeter.com/pion/.
EsperTech—Esper: Event Processing for Java [retrieved Sep. 13, 2012]. http://www.espertech.com/products/esper.php.
Oracle—Intelligent Event Processor Overview [retrieved Sep. 13, 2012]. http://docs.oracle.com/cd/E19509-01/820-3378/dsgn_iep-about_c/index.html.
JBoss—Drools Fusion User Guide [retrieved Sep. 13, 2012]. http://docs.jboss.org/drools/release/5.2.0.CR1/drools-fusion-docs/html_single/.
CISCO—CISCO Prime for IT and Service Providers [retrieved Sep. 13, 2012]. http://www.cisco.com/en/US/prod/netmgtsw/prime.html.
Microsoft SQL Server StreamInsight [retrieved Sep. 13, 2012]. http://www.microsoft.com/sqlserver/en/us/solutions-technologies/business-intelligence/complex-event-processing.aspx.
NASTEL—Application Performance Monitoring Product Overview [retrieved Sep. 13, 2012]. http://www.nastel.com/products/business-transaction-performance-reduce-risks-and-ensure-stability.html.
EventGnosis—Event Processing Made Simple! [retrieved Sep. 13, 2012]. http://www.eventgnosis.com/.
Informatica Complex Event Processing—RulePoint [retrieved Sep. 13, 2012]. http://www.informatica.com/us/products/complex-event-processing/.
Starview Platform Overview [retrieved Sep. 13, 2012]. http://www.starviewinc.com/business-analytics-optimization-platform/.
Starview Platform Features [retrieved Sep. 13, 2012]. http://www.starviewinc.com/business-analytics-optimization-platform/features/.
TIBCO—TIBCO BusinessEvents [retrieved Sep. 14, 2012]. http://www.tibco.com/products/event-processing/complex-event-processing/businessevents/default.jsp.
TIBCO—TIBCO ActiveSpaces Enterprise Edition [retrieved Sep. 14, 2012]. http://www.tibco.com/products/automation/in-memory-computing/in-memory-data-grid/activespaces-enterprise-edition/default.jsp.
ETALIS—Event-Driven Transaction Logic Inference System [retrieved Sep. 14, 2012]. http://code.google.com/p/etalis/.
Christoph Heinz et al., "Business Activity Monitoring with Stream Mining on Case TeamBank," HMD-Practice of Computer Science, vol. 268, Aug. 2009 (with machine translation).
U.S. Appl. No. 13/354,892, filed Jan. 20, 2012; Harris et al.
U.S. Appl. No. 13/209,996, filed Aug. 15, 2011; Cammert et al.

* cited by examiner

SYSTEMS AND/OR METHODS FOR STATISTICAL ONLINE ANALYSIS OF LARGE AND POTENTIALLY HETEROGENEOUS DATA SETS

TECHNICAL FIELD

Certain example embodiments described herein relate to Complex Event Processing (CEP) systems and/or methods. More particularly, certain example embodiments relate to techniques for using CEP for statistical analysis of cache behavior and parameters, e.g., in connection with large and potentially heterogeneous data sets (e.g., so-called "Big Data").

BACKGROUND AND SUMMARY OF EXAMPLE EMBODIMENTS OF THE INVENTION

Stream processing typically follows the pattern of continuous queries, which may be thought of in some instances as being queries that execute for a potentially indefinite amount of time on data that is generated or changes very rapidly. Such data are called streams, and streams oftentimes comprise events. Such streams often exist in real-world scenarios, e.g., as temperature readings from sensors placed in warehouses or on trucks, weather data, entrance control systems (where events are generated whenever a person enters or leaves, for instance), etc. Events may include attributes (also sometimes referred to as a payload) such as, for example, the value of temperature readings and metadata (sometimes referred to as a header or header data) such as, for example, creation date, validity period, and quality of the event. Possible events occurring in an environment typically are schematically described by so-called event types, which in some respects are somewhat comparable to table definitions in relational databases. Streams may in certain scenarios be organized in channels that in turn are implemented by an event bus. Channels and event types in this sense may be considered orthogonal concepts, e.g., in the sense that channels may comprise events of several event types, and events of the same event type might be communicated via different channels.

Event streams are typically used in computer systems adhering to the event-driven architecture (EDA) paradigm. In such systems, several computer applications each execute on distinct computer systems and are typically interconnected by a network, such as a local area network or even the Internet. Each application typically is in charge of executing a certain processing task, which may represent a processing step in an overall process, and each application typically communicates with the other applications by exchanging events. Examples include the calculation of complex mathematical models (e.g., for weather forecasts or scientific computations) by a plurality of distributed computers, the control of an assembly line (e.g. for the manufacturing of a vehicle, wherein each assembly step is controlled by a particular application participating in the overall assembly process), etc. It is noted that a multitude of processes, potentially of different applications (and thus not necessarily of one overall process), also may be supported. Generally, events may be represented in a variety of different formats. The XML format, for instance, is one common format in which events and their associated event types may be represented.

In a Complex Event Processing (CEP) system, events may be evaluated and aggregated to form derived (or complex) events (e.g., by a engine or so-called event processing agents). A typical manner to specify such evaluation and aggregation involves using CEP queries, which oftentimes are formulated in an SQL-like query language that is enhanced by some CEP-specific clauses such as, for example, a WINDOWS or ROWS clause to define conditions that relate to the occurrence of events within streams or channels. Typically, CEP systems are used to automatically trigger some activity, e.g., an appropriate reaction on an unusual situation that is reflected by the occurrence of some event patterns. A common mechanism to trigger reactions includes querying (or having some agent(s) listening) for specific complex events on dedicated channels and executing the appropriate action when such an event is encountered.

In contrast with database systems that run queries to analyze a certain state of the data, CEP systems perform "continuous" query execution on streams, e.g., a query is "constantly" and "continuously" evaluated "forever."

Thus, CEP may be thought of as a processing paradigm that describes the incremental, on-the-fly processing of event streams, typically in connection with continuous queries that are continuously evaluated over event streams.

The newly introduced notion of "Big Data" refers to the fact that enterprises nowadays face challenging data management problems. Data is massively increasing in terms of volume, variety, and velocity. Besides the increase of common transaction-based data, other data sources emerge such as, for example, data from social media, mobile devices, sensor networks, etc. For companies striving to improve customer interaction and responsiveness, a suitable management of that big data is of important. It therefore will be appreciated that their corresponding enterprise applications and analytic tasks could benefit from more efficient and insightful data access, particularly when complemented with sophisticated data analysis techniques.

Distributed grid technologies, for example, have gained importance in the context of a way to provide efficient data access. By using multiple in-memory caches, efficient data access as well as scalability can be achieved. Recently CEP technologies such as those outlined above have been coupled with that caching approach to allow for efficient cache searching. In some such cases, continuous SQL queries process the streams of updates on the caches, search for relevant data, and publish these search results continuously to dedicated result caches. Thus, users can directly observe latest results by querying those result caches.

Unfortunately, however, it is believed that no meaningful consideration has been given to the statistical modeling of cache characteristics. Similarly, it is believed that no meaningful consideration has been given to the fact that such a model can be automatically updated and can keep track of latest changes in the cache characteristics.

In general, the use of data mining and statistical modeling is well-established in enterprise applications, as it allows one to capture core characteristics of data, derive important relationships, and forecast future behavior. While there are a number of existing approaches to general data mining, they do not provide a full spectrum of solutions. For example, a database system can manage large amounts of data and store them persistently. By means of queries selected subsets of the data can be retrieved and used for further analysis. Using that approach, standard data mining algorithms are implemented on top of the database system. To get a summary of all data currently stored in the database, several statistical models can be computed, including the estimation of value distributions. However, database systems are not designed for continuous processing of incoming events. As a consequence, they are also not designed for incrementally updating statistical models in a real-time manner. Because of slow disk access, one can query the database in a periodic way and compute according statistical models. However, decisions might be based on outdated data characteristics. Database systems also support triggers that can be fired when database operations are executed, although these triggers do not always scale well for large amounts of data streaming in with high rates.

Using a data warehouse approach, a database manages the data, which is periodically loaded into a data warehouse that conducts additional data-condensing operations. Standard mining techniques can then be applied on top of the warehouse. Unfortunately, similar to the database approach, the data warehouse approach is not suitable, as it is not always kept up-to-date. Data generally is loaded into the warehouse in a periodic fashion and then the data characteristics are computed, which is typically a very time-consuming process. Thus, statistical models can be computed, but most likely will not be up-to-date with respect to the latest trends.

As indicated above, distributed grids typically utilize multiple in-memory caches to allow for fast data access. The data being cached can originate from arbitrary sources such as, for example, databases or streaming data sources. In order to search for specific data, ad-hoc queries can be used. Ad-hoc queries typically traverse all data currently in the cache and select the data of interest. To accelerate the search, caches typically support an additional indexing of relevant attributes. Unfortunately, however, using ad-hoc queries for searching in the cache contents may be very time consuming, as indexes cannot always be leveraged, in which case the complete cache may need to be traversed. Additionally, these queries typically can only derive basic summary statistics of the cache contents such as, for example, minimum, average, and count statistics. These simple statistics may not uncover important data characteristics as can be done with more sophisticated statistical models.

A recent extension of the distributed grid approach uses Complex Event Processing to accelerate search requests. Typically, caches can provide listeners that provide notifications concerning recent cache operations. Continuous queries are registered to those listeners and incrementally process the notifications on cache operations. Each continuous query corresponds to one search request. The result streams of the query are continuously inserted or removed from an associated search result cache. Thus, the result cache contains the latest result for the current cache contents, which is the same data as if an ad-hoc query would have been executed over the current cache. Because continuous SQL queries over cache update operations are used to compute search results in an incremental online manner, the search operation on the cache is very fast. However, as in the previous approach, SQL queries can only derive basic summary statistics such as those listed above. It would be desirable to exploit higher-value statistical analysis to uncover and analyze the characteristics of the stream, which cannot be done with continuous SQL queries and current techniques. Additionally, it is believed that the continuous query approach currently is limited to accelerating searches in caches, while it would be desirable to allow for other applications.

Thus, it will be appreciated that there is a need in the art for the management and analysis of Big Data, as well as improved techniques for using grid technologies for caching big data.

One aspect of certain example embodiments relates to providing a meaningful live analysis of major characteristics of a cache. In addition to considering simple descriptive statistics, certain example embodiments make it possible to leverage well-defined statistical models that capture the main behavior of the cache. These models may in some instances be computed in an online manner over cache changes and therefore may automatically keep track of recent cache behavior. Such features are advantageous, as analytical models typically are derived in a periodic way and, as a consequence, these models are most likely out-dated.

Another aspect of certain example embodiments relates to combining two dimensions of the cache behavior. The resulting combined model may be thought of as a compact representation of the cache behavior that captures not only the way the data in the caches behaves, but also how it evolves over time. Certain example embodiments provide a complementing visual representation of the combined model, e.g., to provide the user with an intuitive way to analyze the cache and its behavior. By setting a temporal analysis range, for example, the user may additionally or alternatively adjust the time span on which the continuous analysis is based. Thus, short-term as well as long-term tendencies advantageously can be revealed.

Certain example embodiments advantageously make it possible to identify changes in the data and take quick reactions to such changes in the data, while also enabling proactive reactions to be taken based on recent developments. Thus, enterprise applications on top of the cache may be accorded powerful analytical means to capture recent changes.

Of course, standard data mining is different from stream data mining, as the latter approach refers to mining algorithms more specifically adapted to the streaming data scenario. And while there are a number of commercially available CEP engines that are built to allow for low-latency processing of high-volume event streams, none seems to leverage stream mining on cache update streams in order to derive continuously a statistical model of the stream that describes the data distribution and the validity characteristics in different data regions in a combined manner. Accordingly, none seems to provide for the online computation of a combined distribution and validity model, or comparable technologies.

In certain example embodiments, a method of analyzing the behavior and parameters of a cache in a computer system over a temporal range of analysis is provided. Notifications indicating that respective cache operations have been performed in connection with respective elements and the cache are received over a first stream, with each said operation having an operation type, and with the operation type being designated as one of an insert, update, or remove operation for the respective element. For each received notification where a selected element attribute of interest is available therein: information regarding a key of the respective element, the respective selected element attribute of interest, the respective operation type, and respective timestamp(s) associated with the respective operation, is extracted from the respective notification; and value and validity distribution models are computed using the extracted information. The computing of the value distribution model, in connection with a given notification and an associated given element, comprises: updating a temporal buffer of inserted and not yet removed and/or updated elements to include an entry for the given element, with the temporal buffer defining a range of elements to be considered in the computing of the value distribution model; and calculating a value distribution for the selected attribute of interest based on elements in the temporal buffer. The computing of the validity model, in connection with a given notification and an associated given element, comprises: ignoring the given notification when the given element has an insert operation type; calculating a validity value for the given element as a difference between first and second timestamps, where (a) for remove operation types, the first timestamp indicates when the given element was removed and the second timestamp indicates when the given element was inserted, and (b) for update operation types, the first timestamp indicates when an old element was removed and the given element was inserted and the second timestamp indicates when the old element was inserted; ignoring the given notification and the given element when the validity value is greater than a window size corresponding to the temporal range of analysis; and when the validity value is less than or equal to the window size determining a temporal partition of the temporal range of analysis into which the attribute of interest associated with the given element falls, and publishing an event to a second stream, the event indicating the validity value and the determined temporal partition; and running a query on the second stream in order to derive summary statistics for validity values in the partitions.

In certain example embodiments, an event processing system for analyzing the behavior and parameters of a cache in a computer system over a temporal range of analysis is provided. An event bus is configured to receive a first stream of events corresponding to respective operations on the cache, with each said event being associated with a respective element operating on the cache, and with each said operation having an operation type, and the operation type being selected from the group consisting of insert, update, and remove operation types. An event processing engine comprising processing resources includes at least one processor, the event processing engine being configured, for each event received from the first stream where the respective element has a pre-selected attribute of interest associated therewith, to (a) compute a value distribution model and (b) compute a validity distribution model. Part (a) is computed by at least: updating a temporal buffer of inserted and not yet removed and/or updated elements to include an entry for the respective element, with the temporal buffer defining a range of elements to be considered in computing the value distribution model and including at least data indicative of the attribute of interest for the elements therein; and calculating a value distribution of the attributes of interest for the elements in the temporal buffer. Part (b) is computed by at least: ignoring the respective event when the given element has an insert operation type; calculating a validity value for the respective element as a difference between first and second timestamps, with the first timestamp indicating when the given element was removed and the second timestamp indicating when the given element was inserted for remove operation types, and with the first timestamp indicating when an old element was removed and the given element was inserted and the second timestamp indicating when the old element was inserted for update operation types; ignoring the respective event when the validity value is greater than a window size corresponding to the temporal range of analysis; and when the validity value is less than or equal to the window size, determining a temporal partition of the temporal range of analysis into which the attribute of interest associated with the given element falls, and publishing a new event to a second stream of events, the new event indicating the validity value and the determined temporal partition. A query is run on the second stream in order to derive summary statistics for validity values in the partitions.

In certain example embodiments, a method of analyzing the behavior and parameters of a cache in a computer system over a temporal range of analysis is provided. Notifications indicating that respective cache operations have been performed in connection with respective elements and the cache are received over a first stream, with each said operation having an operation type, and with the operation type being designated as one of an insert, update, or remove operation for the respective element. For each received notification where a selected element attribute of interest is available therein: information regarding a key of the respective element, the respective selected element attribute of interest, the respective operation type, and/or respective timestamp(s) associated with the respective operation, is extracted from the respective notification; and a value distribution model and a validity distribution model are computed using the extracted information.

In certain example embodiments, there is provided a non-transitory computer readable storage medium tangibly storing instructions that, when executed by at least one processor of a system, perform a method as described herein.

Similarly, in certain example embodiments, there is provided a computer program comprising instructions for implementing a method as described herein; and/or an event processing system for analyzing the behavior and parameters of a cache in a computer system over a temporal range of analysis, adapted for performing a method described herein.

These aspects, features, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Figure 1:
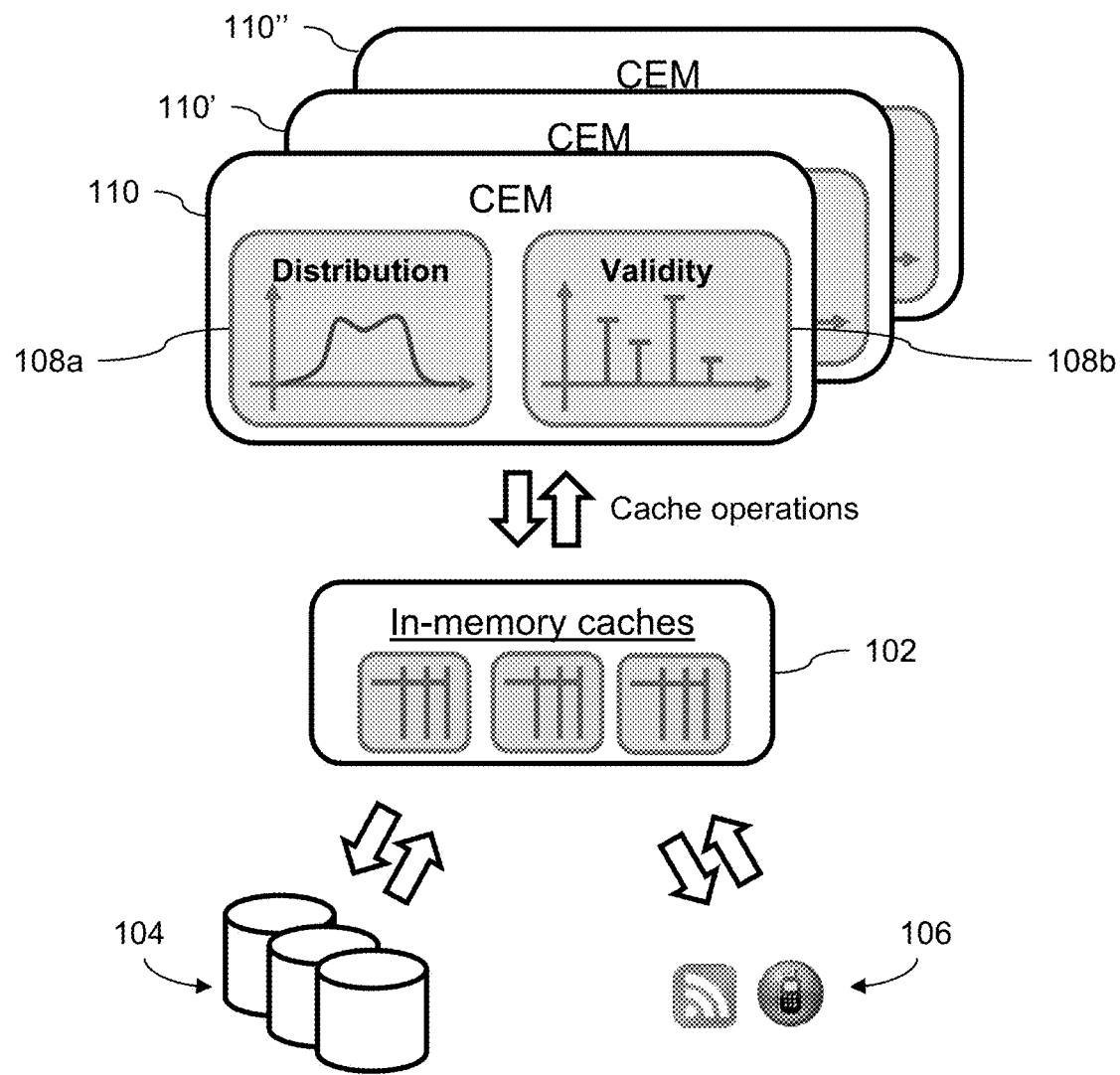
FIG. 1 illustrates fundamentals behind Cache Element Model (CEM) computation in accordance with certain example embodiments.

Certain example embodiments combine caching Big Data with advanced online analysis technologies. Following the processing paradigms of Complex Event Processing, so-called stream mining techniques are evaluated continuously over streams of events, delivering well-defined models and metrics of the streams in an online manner. With the help of stream mining (which relates generally to incremental, on-the-fly computation of statistical/analytic models of event streams), a concise, memory-efficient statistical model of the cache can be provided by analyzing the stream of operations on the cache. Certain example embodiments effectively combine two models: The first model estimates the distribution of the cache element values, and the second model estimates how long elements of specific data regions stay in the cache. As the model is continuously maintained, the user is provided with a compact up-to-date view of the current data characteristics in the cache.

In connection with the use of grid technologies for caching big data, certain example embodiments overcome various technical challenges. A first challenge relates to the fact that a cache typically includes a very large amount of data, while the user wants to obtain a compact summary view of recent cache characteristics. A second challenge relates to the fact that the user is not only interested in the data itself, but also typically is interested in its development over time including details such as, for example, how long it has stayed or will stay in the cache. A third challenge addresses how data summary and data development can be combined in an intuitive, easy-to-visualize way. A fourth challenge relates to the desire to make such a combined model online computable with a small memory footprint in a manner that also allows for efficient access to relevant information. A fifth challenge relates to defining a generic architectural framework that allows a similar integration of other stream mining techniques. A sixth challenge relates to the publishing of those models so that different consumers can benefit from them.

Certain example embodiments address these challenges in a combined fashion. For instance, in accordance with certain example embodiments, the first and fourth challenges are addressed by using a stream mining technique for estimating the distribution of cache contents in an online manner. That is, the probability density distribution of the values in the cache may be estimated. For that estimate, a stream mining technique may be used to estimate the distribution in an online manner over a sliding window. This technique may be applied to the stream of insert, remove, and update operations executed on the cache, in certain implementations. Thus, it will be appreciated that density estimation refers generally to mathematical methods used in estimating the probability density function of a data sample.

In accordance with certain example embodiments, the second and the fourth challenges are addressed by maintaining simple statistics over the cache operations. For example, each time an element enters into or is removed from the cache, the region into which certain attributes of the element fall may be determined, the validity of the element may be computed, and summary statistics may be computed, e.g., by means of a continuous query over a sliding window.

In accordance with certain example embodiments, the third challenge is addressed by combining the data distribution model with the validity model. A combined visual model may be generated and display the probability density function (PDF), possibly coloring the regions under the graph. For a selected summary statistic of the validity, the coloring for the regions may be ordered or otherwise organized, so that regions with short or long validities can be quickly identified by observing the intensity of the color and/or another indicator.

In accordance with certain example embodiments, the fifth challenge is addressed by leveraging the processing paradigms of Complex Event Processing. For example, the computation of the distribution and validity model may be encapsulated in a dedicated stream mining operator. That operator can subscribe to a stream of events and continuously produce an output stream with the latest models. In this example context, the input stream may include operations being executed on the cache, for example.

In accordance with certain example embodiments, the sixth challenge is addressed by using an Event-Driven Architecture with an event bus to which event consumers and producers are connected. By defining the summary model as a complex event, it can be published on the event bus and consumed by arbitrary consumers. For example, the model can be stored in statistical result caches, it can be visualized in business user interfaces, its information can be used to trigger an automated reaction, etc.

Referring now more particularly to the drawings in which like numerals indicate like components throughout the several views, FIG. 1 illustrates fundamentals behind Cache Element Model (CEM) computation in accordance with certain example embodiments. As alluded to above, to ensure fast access, some current enterprise applications leverage distributed grids to load large amounts of heterogeneous data (raw or after preprocessing) into in-memory caches 102. The data may come from any number of sources such as, for example, transactional data source(s) 104, streaming data source(s) 106, etc. Current cache technology allows for the registering of listeners on updates of a cache such that the listener receives a notification, for example, each time an element is inserted into, updated in, or removed from, a cache 102. In that context, an element is what is actually stored in the cache 102, and a cache event is a notification that a cache operation involving an element has been executed.

As also alluded to above, continuous queries that evaluate continuously streams of events can be used to process and analyze cache notification streams. Following that processing concept, a dedicated stream mining operator registers a listener to a cache and continuously receives notifications on cache operations. In certain example embodiments, for an incoming notification two models are computed. For selected attributes of an element, a first model 108*a* estimates the probability density functions of the attributes, delivering well-defined estimates of the attribute value distributions. A second model 108*b* analyzes the time elements stay in the cache, which is referred to herein as "validity." This validity is combined with the distribution of the attribute values. By computing additional summary statistics for the validity and the attribute value distribution, a meaningful analysis model can be derived. This model is called Cache Element Model (CEM) 110 and describes how long elements stay in the cache for attribute values of a specific region. In other words, a CEM 110 may be thought of as a statistical model of cache characteristics that is computed in an online manner. Multiple CEMs 110', 110", etc., may be computed over time, and/or for different defined aspects of one or more caches.

Figure 2:
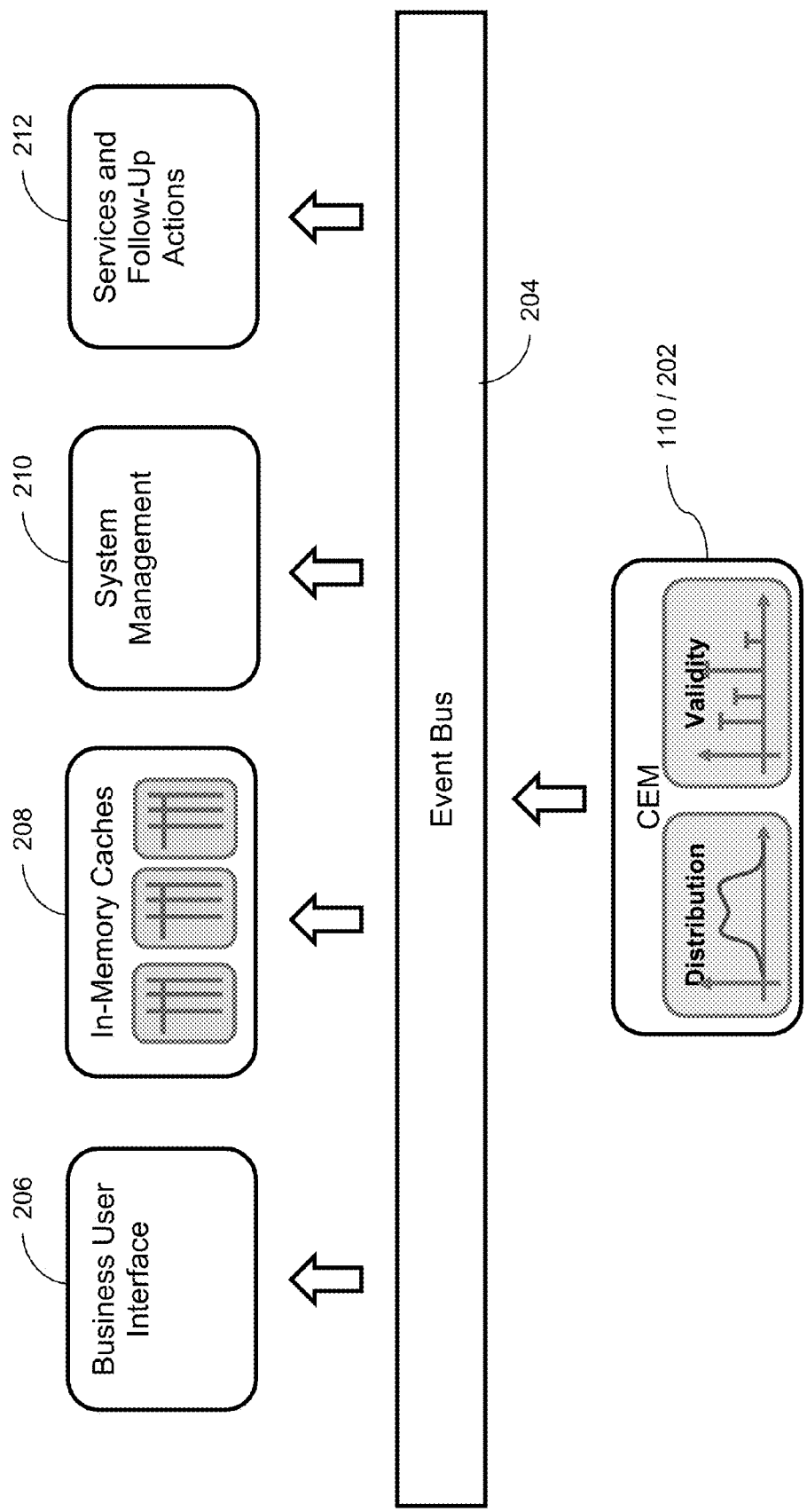
FIG. 2 schematically demonstrates the publishing of a CEM in an Event-Driven Architecture in accordance with certain example embodiments.

FIG. 2 schematically demonstrates the publishing of a CEM in an Event-Driven Architecture in accordance with certain example embodiments. As shown in FIG. 2, the latest CEM 110 for a cache 102 is published as a complex event 202 on an event bus 204. The event bus 204 may be thought of as the central transport layer for arbitrary event producers and event consumers in an Event-Driven Architecture. A CEM can be further processed in a number of different ways once published to the event bus and consumed. For example, a business user interface related consumer 206 may initiate visualization in a user interface, e.g., to provide users with an up-to-date view of the latest cache characteristics. It will be appreciated that this sort of visualization can serve as a starting point for further investigation. A storage consumer 208 may cause the CEM to be stored in a dedicated or other cache that, e.g., that continuously maintains a subset of the last CEMs and potentially facilitates a comparative post analysis of cache development(s). A system management listener 210 and listeners 212 that start or relate to for other services and/or cause follow-up action also may be connected to the even bus 204. This may be useful in comparing a CEM with other event streams, e.g., in order to detect correlations or deviations, etc.

Example Implementation

The following example implementation design describes how to couple in-memory caching technology with stream mining in order to derive CEMs over caches in accordance with certain example embodiments.

A. Preliminaries

1. Cache and Listener

An in-memory cache is designed for a fast retrieval of cached elements. The cache preferably provides map functionality in the sense that elements may be inserted into the cache with a unique key. The key, in turn, may be used to retrieve that specific element from the cache. In addition to the key, a cached element also includes the actual content, which is the information stored in the element. Depending on how structured the element is, this content may correspond to several attributes. Thus, a cache may include key/value pairs with the value being a set of attributes. For the case of object data, for example, the relevant set of attributes may be defined and corresponding access methods may be provided. For the sake of simplicity, the following description assumes that the elements of the cache have the format (key, $attr_1, \ldots, attr_n$).

An element can be inserted, removed, or updated. The validity of the element, or how long it was valid in the cache, is defined as the span between (i) insert and remove, (ii) insert and update, (iii) update and remove, or (iv) update and update. More formally, the start and end timestamp of an element's validity may be defined as a half-open interval: $[t_s, t_e)$. It is assumed that the cache storage model for an element additionally includes the start timestamp, or the time it has been inserted into the cache. This can be leveraged to derive the validity of an element. Alternatively, one can correlate the insert operations with remove/update operations to derive that information. For the sake of simplicity, the first approach is used here, although other approaches could of course be used in different example embodiments. Thus, an element stored in a cache has the following structure:

| Parameter | Description |
| --- | --- |
| key | The key of the element |
| $attr_1, \ldots, attr_n$ | The attributes of the element |
| $t_s$ | The point in time the element has been inserted into the cache |

A cache typically offers an API to programmatically insert, remove, and/or update cache elements. In order to track those operations on a cache, cache event listeners can be registered on a cache. Once registered on a cache, a cache event listener may receive notifications in the following cases:

Insert: An element is newly inserted into the cache;
Update: An element is updated, e.g., an element with the same key already exists in the cache and is then replaced by the new element; and
Remove: The element is removed from the cache.

Overall, the different types of cache notifications may include the following and/or other parameters:

| Notification Type | Parameter | Description |
| --- | --- | --- |
| INSERT | key | The key of the element |
| | $attr_1, \ldots, attr_n$ | The attributes of the element |
| | $t_s$ | The point in time the element has been inserted |
| REMOVE | key | The key of the element |
| | $attr_1, \ldots, attr_n$ | The attributes of the element |
| | $t_s$ | The point in time the element has been inserted |
| | $t_e$ | The point in time the element has been removed |
| UPDATE | key | The key of the element |
| | $attr_1, \ldots, attr_n$ | The attributes of the new element |
| | $attr'_1, \ldots, attr'_n$ | The attributes of the old element |
| | $t_s$ | The point in time the old element has been inserted |
| | $t_e$ | The point in time the old element has been removed and the new one has been inserted |

Regarding the validity interval $[t_s, t_e)$ of an element, the corresponding listener calls for remove and update operations can be exploited to derive that information.

2. Continuous Queries Over Cache Listener Streams

Continuous queries may be applied or subscribed to input streams. Each time a new event arrives, the query is automatically evaluated in an incremental manner. For example, a filter query may check whether each incoming event fulfills a filter predicate. If that is the case, the event is automatically published for further processing. It will be appreciated that the stream to be analyzed by continuous queries is the stream of cache listener notifications in certain example embodiments.

3. Stream Mining Over Cache Listener Streams

As indicated above, in certain example embodiments, the processing paradigm of continuous queries is transferred to stream mining techniques. Each time an event streams in, a statistical model is updated and published. To comply with stream processing requirements, the computation of such a model preferable meets some or all of the following and/or other criteria:

Each element is processed only once;
Per-element processing time is constant;
The amount of allocated memory is constant;
A valid model of the stream is available anytime;
The models incorporate changes in the data stream; and
The provided models should be equivalent to their offline counterparts.

The example stream mining operator explained in the next section meets all of these criteria.

B. Example CEM Calculation Techniques

The CEM calculation techniques may be performed in connection with a connection to the cache event listener, configuration of the CEM, and continuous computation of the CEM. Inputs may include the name of the cache to be monitored, the element attribute(s) to be analyzed, and the temporal range of the analysis. The temporal range may in some cases refer to the range of cache operations that are monitored and may be specified, for example, as the last 1,000 operations, all operations that took place in the last 1 hour, etc.

1. Connection to Cache Event Listener

In Complex Event Processing systems, adapters typically are used to plug into different types of streams. In certain example embodiments, a cache listener adapter may be used. In some cases, this adapter may be dedicated to receiving notifications from the cache event listener, processing them, and forwarding them to the Complex Event Processing system.

Configuration parameters such as, for example, the name of the cache to be monitored, the name of the attribute for which a CEM model is to be computed, etc., may be specified. In the following example, $attr_k$ is the selected value. For each incoming cache notification, a check is made to determine whether the selected attribute is available in the corresponding element. If not, the element is discarded with an optional logging of that element. Otherwise, the key, the selected attribute, the cache operation type, and the timestamp(s) are extracted. For an update operation, the old attribute value additionally may be included. These values are then used to compute the value and the validity distribution.

2. Computation of Value Distribution Model

Before the computation of the distribution model, a temporal buffer of inserted and not yet removed/updated elements is updated. This temporal buffer may define the range of elements that is considered in the latest distribution model to be computed. Basic strategies for maintaining the buffer include a count-based range and a sliding window range. In a count-based range approach, given the parameter n, this strategy continuously maintains the last n inserted and not yet removed/updated elements. In a sliding window range approach, given a window size (for example, 1 hour), this approach continuously maintains the inserted and not yet removed/updated elements being in the time window of the latest element's timestamp minus window size. Of course, these strategies can be combined in certain example embodiments, and other strategies may be used in yet further example embodiments.

The buffer may also include the associated start timestamps of the elements. For both of the example strategies listed above, the buffer is refreshed for each cache operation. In case of an insertion operation, the corresponding element is inserted into the buffer and, if necessary, older elements are removed to fit to the temporal range constraints. In case of a remove operation, the corresponding element is removed from the buffer. In case of an update operation, a remove operation with the old element is executed, followed by an insertion operation with the new element.

The type of value distribution may depend at least in part on the attribute being analyzed, e.g., if it has discrete or continuous values. Stock prices, for example, are continuous, while shopping items are discrete. For the case of discrete data, the value distribution may be estimated by means of histograms. The discussion below focuses on the computation for continuous data, although it will be appreciated that the discrete case can be handled analogously in other implementations. For continuous data, Kernel Density Estimators (KDEs) are used, which are robust and only make minimum assumptions on the data (for example, they do not assume normally distributed data). As is known, Kernel Density Estimation relates to non-parametric mathematical methods for estimating the probability density function of a data sample. In general, Kernel Density Estimators have a kernel function and a bandwidth as main parameters. Practically well-established and theoretically proven settings for those parameters are the Epanechnikow kernel as kernel function and the Normal Scale Rule for the bandwidth computation. These parameters may be used in certain example embodiments, although others can of course be used in their place.

The latest Kernel Density Estimator is computed on top of the elements currently in the buffer. Each time an element enters or leaves the buffer, the Normal Scale Rule is updated, delivering a new bandwidth for the current buffer elements. As a result, constituting elements of the Kernel Density Estimator, namely the current buffer elements and the bandwidth, are published.

3. Computation of Element Validity Distribution

The distribution of the element validites analyzes the timespan an element is kept in the cache. This metric helps analyze the underlying data and its development over time. To allow for a compact view, the validity need not be considered for single elements, but rather may be considered for groups of elements in certain example embodiments. To do so, the domain of the attribute being analyzed (e.g., which values the attribute can have) may be known beforehand. For example, if temperature is the attribute being analyzed, a reasonable domain for most real-world applications is the range between minus 50° and plus 50° Celsius. An associated partitioning could be p1=[−50°,−25°), p2=[−25°,0), p3=[0,25°), p4=[25°, 50°).

The computation of the element validity distribution may rely on the cache listener streams and the defined window size. Because only remove and update notifications provide validity information, a logical first step may be to filter out insert notifications. For example, for an incoming remove/update notification, the following pseudo-code snippet may be executed (with $attr_k$ New being null for remove or insert operations and $t_e$ being null for insert operations):

```
1: for each incoming notification(type,key,attr_kOld,attr_kNew,t_s,t_e)
2:   if(type is INSERT)
3:     skip event;
4:   else
5:     set validity as t_e−t_s;
6:     if(validity > window size)
7:       skip event;
8:     determine index i, so that attr_kOld is in partition p_i;
9:     publish event with partition identifier and validity;
```

According to that pseudo-code snippet, the validity is computed and the corresponding partition into which the attribute value falls is determined. The next step is to generate an event including that information. Thus, the initial stream of notifications is first filtered and then mapped to a new stream containing partition and validity information in each event. An element of that stream has two attributes: ValidityLength and PartitionId.

This transformed stream, ValidityPartitionStream, is then analyzed by a continuous query. This query derives summary statistics of the validity for the different groups with respect to a temporal range. Consider the following example query:

```
SELECT
    MIN(ValidityLength),
    MAX(ValidityLength),
    AVG(ValidityLength),
    STDDEV(ValidityLength),
    Median(ValidityLength),
    25%Quartil(ValidityLength),
    75%Quartil(ValidityLength)
FROM ValidityPartitionStream WINDOW(RANGE 1 HOUR)
GROUP BY PartitionId;
```

The temporal range (which in the above example query is one hour) may be adapted to the temporal range of the value distribution computation in order to keep the two models synchronized. Overall, this query provides statistics on the timespan elements with attribute values in a specific partition stay in the cache. Each time the query delivers a result, the validity distribution is adapted accordingly. Thus, for each partition of the attribute value partitioning, summary statistics on how long the elements belonging to that partition stay in the cache are available.

Overall, the combined information of value and validity distribution provides a compact model on how attribute data is distributed and how long the corresponding elements typically are valid.

4. Summary of Techniques for Example CEM Calculation

Figure 3:
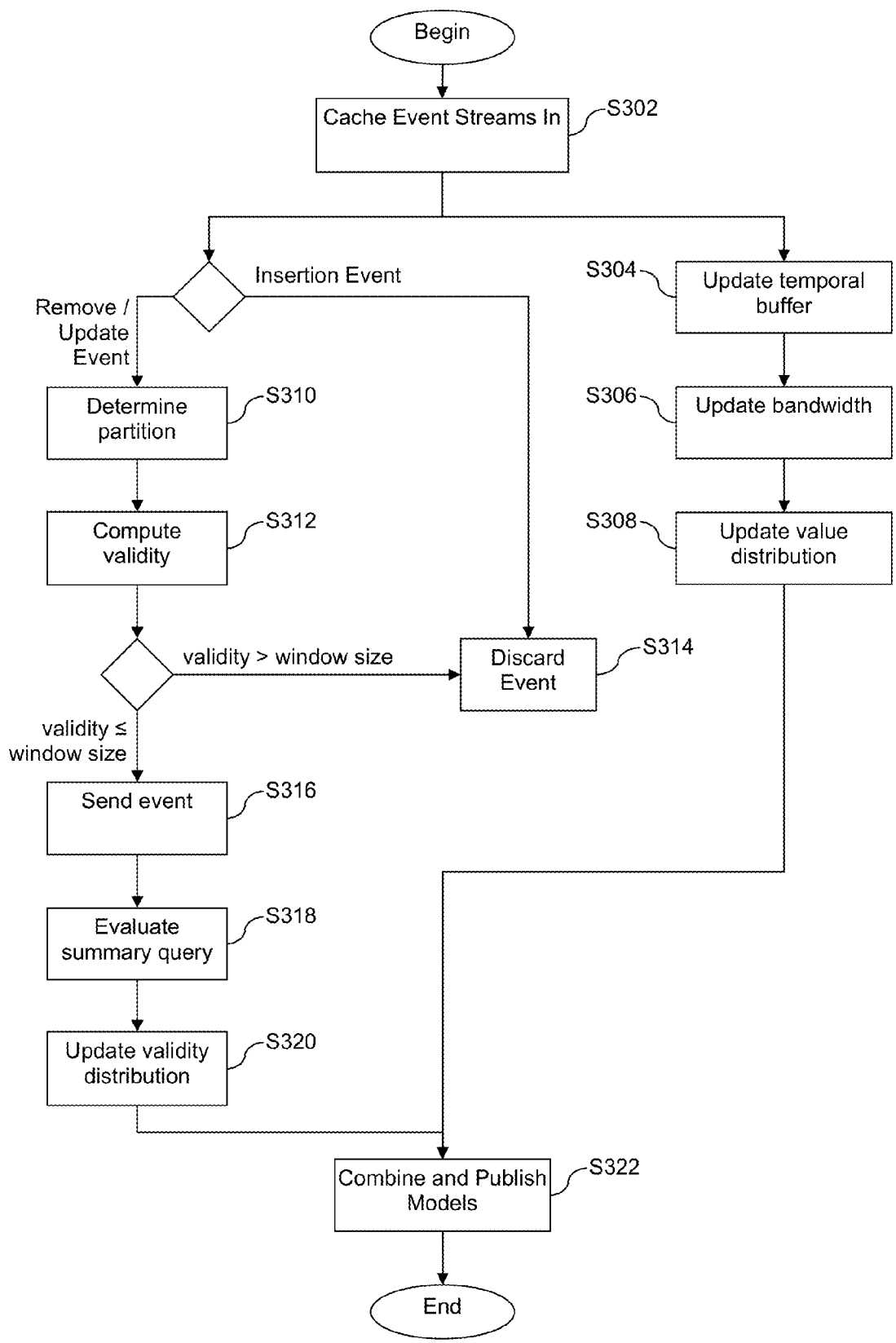
FIG. 3 is a flowchart showing how a CEM can be computed in accordance with certain example embodiments.

FIG. 3 is a flowchart showing how a CEM can be computed in accordance with certain example embodiments. A cache event streams in, in step S302, which potentially initiates the creation of the two models. For instance, as shown in FIG. 3, the right side of the flowchart corresponds generally to the value distribution model, and the left side of the flowchart corresponds generally to the validity model. Referring first to the value distribution model, and assuming the KDE techniques are to be used, the temporal buffer is updated in step S304, and the bandwidth is updated in step S306. The value distribution is updated in step S308, e.g., based on these inputs and any associated parameters passed to a KDE calculator.

With respect to the validity model computation, a determination first is made as to whether the cache event pertains to an insertion event, or a removal or update event. If the event corresponds to an insertion event, then the event is discarded in step S314. On the other hand, if the event corresponds to either a removal or update event, then the partition is determined in step S310, and the validity is computed in step S312. A comparison is then made as between the validity and the window size. If the validity is greater than the window size, then the event is discarded in step S314. On the other hand, if the validity is less than or equal to the window size, then an event is created in step S316 and sent for evaluation by the summary query in step S318. Based on this information, the validity distribution is updated in step S320.

Once the validity and value distributions are updated, the models are combined and may be published in step S322, e.g., for subsequent visualization, using the example techniques set forth below.

5. Visualization of Combined Value and Validity Distribution

A benefit of certain example embodiments relates to the fact that the combination of value and validity distribution helps to provide a compact and meaningful model of data recently handled in the cache. The following is an example combined visualization algorithm that may be used in connection with certain example embodiments:
1. Select the attribute to be analyzed;
2. Plot the value distribution onto an XY plot;
3. Partition the x-axis according to the predefined partitioning of the attribute domain;
4. Select one statistical summary measure of the validity;
5. For each partition and summary measure, compute a color from a predefined color range using the relative ordering of the partition summary measures; and
6. For each partition, fill the area between x-axis and value distribution with the corresponding color and additionally print the measure value into that area.

It will be appreciated that indicia other than color may be used in connection with different example embodiments, as indicated above.

Figure 4:
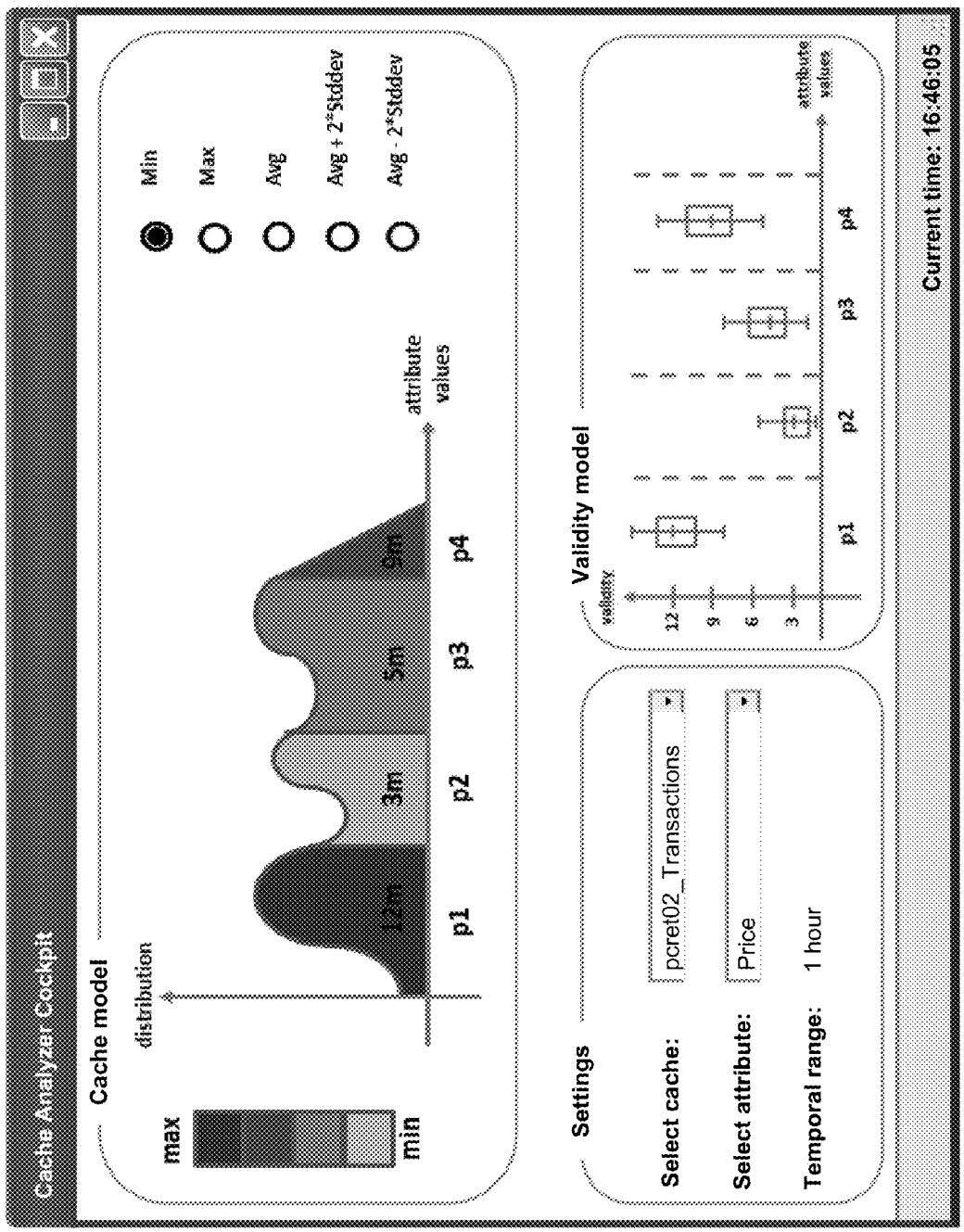
FIG. 4 is an example cache analysis user interface, which illustrates how the two statistical summary views on cache contents can be displayed in accordance with certain example embodiments.

An additional, more detailed view of the validity statistics for the different partitions may include Box-and-Whisker plots, for example. The continuous query may deliver the corresponding descriptive statistics, which may in turn be displayed for each partition of the attribute domain. In this vein, FIG. 4 is an example cache analysis user interface, which illustrates how the two statistical summary views on cache contents can be displayed in accordance with certain example embodiments. As can be seen from FIG. 4, the cache model displays the combined value and validity model, while the validity model displays the Box-and-Whisker plots for the partitions. The radio buttons in the cache model can be used to select one of the computed summary statistics for the validity model (e.g., minimum, maximum, average, average plus or minus 2 standard deviations, etc.), and the settings can be altered to impact, for example, the cache of interest, the selected attribute, and the temporal range.

C. Optional Additional or Alternative Features

As indicated above, other density estimation techniques may be used in connection with certain example embodiments. The example above uses histograms and Kernel Density Estimation with Epanechnikov kernel and Normal Scale Rule. However, other example embodiments may by virtue of their flexible design make use of other density estimation techniques such as, for example, Gaussian Mixture Models, Wavelet Density Estimators, etc.

Similarly, although the examples above focused on one-dimensional data by analyzing one attribute of cache elements, it is possible to use the example techniques set forth herein to make multidimensional estimations on multidimensional data. For example, multiple attributes can be analyzed by means of suitable multidimensional density estimation techniques, thereby potentially allowing for a detection of inter-attribute relationships.

By using incrementally computable, approximate density estimators, for example, a complete value distribution model of the cache can be derived. The temporal buffer can be skipped and by adapting the example pseudo-code algorithm above (e.g., by removing lines 6 and 7), the window is removed from the computation of the validity model. Thus, it may be possible to analyze the complete cache.

If the temporal range is too large and/or the arrival rate of cache notifications is too high, the evaluation of the Kernel Density Estimator can become computationally expensive due to large buffer sizes. To address that problem, the estimator can be compressed before publishing by using, for example, splines or wavelets.

Certain example embodiments involve partitioning the attribute domain. However, if no suitable partitioning is available, a training phase can be established. In that phase, the Kernel Density Estimator may be computed. By analyzing the structure of that estimator, clusters of data can be derived, which correspond to local density concentrations. These clusters can be exploited to partition the domain. Thus, it becomes possible to provide techniques that learn how to accomplish partitioning.

The current value and validity models can be stored in a periodic fashion, e.g., to a suitable data repository. This may allow the user to compare the current model with previous models, e.g., to analyze the cache behavior over time.

Similarly, cache models with different temporal ranges can be maintained, e.g., to compare short-term with long-term behavior of the cache contents.

The example models discussed herein can also be used to compare caches with each other. Based on corresponding distance measures, the similarity of caches can be determined. This can serve as starting point for the detection of similarities and dependencies in some cases.

As for the value distribution, the validity distribution can also be estimated by means of density estimation techniques instead of or in addition to Box-and-Whisker plots.

Based on the models, an automatic monitoring process can be established that continuously observes the current models and checks for anomalies. In case of a detected anomaly, an automatic reaction may be triggered, e.g., a follow-up process may be started, an email may be sent, a service may be called, etc.

Similar to maintaining the validity distribution, certain example embodiments can additionally or alternatively derive statistics on the access of elements, e.g., to identify hot element regions or regions where elements are often queried. These and/or other similar element access statistics may be maintained and/or visually presented for a user to take actions (e.g., moving frequently used data to faster or more easily accessed areas, etc.).

Example Applications

As indicated above, the example techniques described herein may be used in connection with a variety of different applications. Several such example applications are described, although it will be appreciated that there are of course additional applications that could benefit from the techniques described herein and also that the techniques may be used in different ways in the applications discussed below.

A. Cache Management for Administrators

In the context of big data, the corresponding IT landscape of companies may include distributed grids as well as one or more Complex Event Processing engines. The distributed grid in turn may include a possibly large number of disparate and remotely located cache instances. In such a setup, it would be desirable to provide well-defined load balancing for those caches, e.g., helping to ensure that the way data is distributed among the caches is logical and efficient.

The example techniques for maintaining value and validity distributions of a cache provide an administrator with well-defined means for analyzing and reconfiguring caches. Besides common cache data (such as, for example, number of elements in the cache or overall cache size), the example techniques set forth herein may allow for a much more fine-grained analysis of the current cache state. For instance, by inspecting the value distributions for element attributes, the administrator can determine clusters of elements, e.g., value regions where many elements are concentrated. The derived information of the element validity provides information in which value regions elements stay for a longer time in the cache and where not. Based on this information, the cache layout can be adapted. For example, elements with low validity can be maintained in a separate cache, and those with a long validity can be maintained in another cache. Using the value distribution, the administrator can easily define corresponding rules for mapping elements to caches, e.g., by inspecting clusters in the distribution. An advantage is that the administrator can access a compact visual model of the current cache behavior that summarizes the main characteristics of the cache contents with respect to the selected element attribute, e.g., as can be appreciated from the FIG. 4 example screenshot. This may in turn allow the administrator to quickly observe the recent development of a cache instance.

B. Evaluation of Marketing Campaign

Consider an example scenario where a company runs an advertisement on the radio or on television for its online shop. In accordance with the terms of the example advertisement, for instance, starting at 10 am, the first 500 customers completing an online order receive 20% discount. The activity of the customers while browsing in the online shop is managed in a cache in order to allow other applications access to that information, with such other applications including, for example, order processing, customer segmentation, product recommendation systems, etc. These activity events may include, for example, the beginning of an order (when the first item is inserted into the shopping cart), the final completion/cancelling of the order, etc.

The value and validity models for the cache may allow the marketing manager to analyze current shopping behavior of customers in a continuous fashion. As value distribution, a customer segmentation can be used, as may the order volume, the number of items in the shopping cart, the item types, etc. In conjunction with the validity information that defines the timespan between starting and completing an order (or more generally the order time), the manager can reveal interesting relationships. Such relationships may be, for example, that teenagers have the shortest order time; the higher the order volume, the longer the order time is; customer buying notebooks have a short order time; the longer the order time, the higher the risk of a cancelled order; etc. Given the configurable temporal range, the manager can focus on tracking recent customer behavior, if desired.

C. Business Process Monitoring

Business processes include steps, and these steps typically have a timespan in which they are executed. Therefore, one can cache the process step transitions to allow for a detailed analysis of these transitions. In that context, the value and validity model can be used to quickly analyze the execution of such process steps. For example, the value distribution can be defined for the different process steps, for different teams executing those steps, etc. The validity defines how long the step took. Using such an approach, one can quickly identify time-consuming steps, evaluate the performance differences among the different teams, etc.

Certain example embodiments may use Terracotta Big Memory caching to store the cacheable partitions in off-heap memory. See, for example, U.S. application Ser. No. 13/354,892, filed on Jan. 20, 2012, for a description of such example techniques. The entire contents of this application are hereby incorporated herein by reference.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of analyzing the behavior and parameters of a cache in a computer system over a temporal range of analysis, the method comprising:
   receiving, over a first stream, notifications indicating that respective cache operations have been performed in connection with respective elements and the cache, each said operation having an operation type, the operation type being designated as one of an insert, update, or remove operation for the respective element; and
   for each received notification where a selected element attribute of interest is available therein:
      extracting, from the respective notification, information regarding a key of the respective element, the respective selected element attribute of interest, the respective operation type, and respective timestamp(s) associated with the respective operation; and
      computing value and validity distribution models using the extracted information;

wherein the computing of the value distribution model, in connection with a given notification and an associated given element, comprises:

updating a temporal buffer of inserted and not yet removed and/or updated elements to include an entry for the given element, the temporal buffer defining a range of elements to be considered in the computing of the value distribution model; and calculating a value distribution for the selected attribute of interest based on elements in the temporal buffer; and wherein the computing of the validity model, in connection with a given notification and an associated given element, comprises:

ignoring the given notification when the given element has an insert operation type;

calculating a validity value for the given element as a difference between first and second timestamps, for remove operation types, the first timestamp indicating when the given element was removed and the second timestamp indicating when the given element was inserted, and for update operation types, the first timestamp indicating when an old element was removed and the given element was inserted and the second timestamp indicating when the old element was inserted;

ignoring the given notification and the given element when the validity value is greater than a window size corresponding to the temporal range of analysis; and when the validity value is less than or equal to the window size:

determining a temporal partition of the temporal range of analysis into which the attribute of interest associated with the given element falls; and publishing an event to a second stream, the event indicating the validity value and the determined temporal partition; and running a query on the second stream in order to derive summary statistics for validity values in the partitions.

2. The method of claim 1, further comprising generating a combined model based on the computed value and validity distribution models.

3. The method of claim 2, further comprising outputting a visual representation of at least the combined model to a display device.

4. The method of claim 3, wherein the visual representation includes summary validity statistics including minimum, maximum, average, and standard deviation of the validity length.

5. The method of claim 1, further comprising plotting the value distribution for the attribute of interest in a graph, the graph having colors and/or other indicators in order to also reflect an aspect of the validity distribution model therein.

6. The method of claim 1, further comprising:

receiving input designating the attribute of interest;

computing value and validity distributions for the designated attribute of interest;

plotting the value distribution for the attribute of interest in a graph in accordance with a first coordinate system;

partitioning a first axis of the first coordinate system in accordance with temporal partitions of the temporal range;

receiving input designating one statistical summary measure of validity;

for each partition of the first axis and summary measure, computing a color from a predefined color range using the relative ordering of the summary measures across the partitions; and for each said partition, filling the area between first axis and value distribution with the corresponding color.

7. The method of claim 6, further comprising labeling each partition with associated summary measure value.

8. The method of claim 1, further comprising generating a graph including Box-and-Whisker plots of validity statistics for each said temporal partition.

9. The method of claim 1, wherein the temporal range is updatable by a user.

10. The method of claim 1, wherein the updating of the temporal buffer comprises:

for an insert operation, inserting the respective element into the buffer, and removing older elements from the buffer if necessary to fit temporal range constraints;

for a remove operation, removing the respective element from the buffer; and for an update operation, removing the old element from the buffer followed by inserting the new element into the buffer.

11. The method of claim 1, wherein the calculating of the value distribution is performed in connection with a kernel function and bandwidth strategy.

12. The method of claim 1, wherein:

the calculating of the value distribution is performed in connection with kernel density estimation and predetermined kernel function and bandwidth parameters, and the predetermined kernel function parameter specifies Epanechnikow kernel functionality and a Normal Scale Rule is used for computing the bandwidth.

13. The method of claim 12, wherein the Normal Scale Rule is updated each time an element enters or leaves the buffer, thereby reflecting a new bandwidth.

14. The method of claim 1, wherein the computer system includes multiple caches and the first stream receives notifications only for a preselected one or more caches of the computer system.

15. The method of claim 1, wherein each said notification includes at least a key of the associated element and one or more attributes of the associated element.

16. A non-transitory computer readable storage medium tangibly storing a computer program comprising instructions that, when executed, perform a method according to claim 1.

17. An event processing system for analyzing the behavior and parameters of a cache in a computer system over a temporal range of analysis, comprising:

an event bus configured to receive a first stream of events corresponding to respective operations on the cache, each said event being associated with a respective element operating on the cache, each said operation having an operation type, and the operation type being selected from the group consisting of insert, update, and remove operation types; and an event processing engine comprising processing resources including at least one processor, the event processing engine being configured, for each event received from the first stream where the respective element has a pre-selected attribute of interest associated therewith, to:

(a) compute a value distribution model by at least:

updating a temporal buffer of inserted and not yet removed and/or updated elements to include an entry for the respective element, the temporal buffer defining a range of elements to be considered in computing the value distribution model and including at least data indicative of the attribute of interest for the elements therein, and calculating a value distribution of the attributes of interest for the elements in the temporal buffer; and (b) compute a validity distribution model by at least:

ignoring the respective event when the given element has an insert operation type;

calculating a validity value for the respective element as a difference between first and second timestamps, the first timestamp indicating when the given element was removed and the second timestamp indicating when the given element was inserted for remove operation types, and the first timestamp indicating when an old element was removed and the given element was inserted and the second timestamp indicating when the old element was inserted for update operation types;

ignoring the respective event when the validity value is greater than a window size corresponding to the temporal range of analysis; and when the validity value is less than or equal to the window size:

determining a temporal partition of the temporal range of analysis into which the attribute of interest associated with the given element falls; and publishing a new event to a second stream of events, the new event indicating the validity value and the determined temporal partition; and running a query on the second stream in order to derive summary statistics for validity values in the partitions.

18. The system of claim 17, wherein the event processing engine is further configured to generate a combined model based on the computed value and validity distribution models.

19. The system of claim 17, wherein the event processing engine is further configured to generate output corresponding to a visual representation of at least the combined model for display on a display device of the system.

20. The system of claim 17, wherein the event processing engine is further configured to plot, in a user interface, the value distribution for the attribute of interest in a graph, the graph having colors and/or other indicators in order to also reflect an aspect of the validity distribution model therein.

21. The system of claim 17, further comprising a user interface configured to receive input designating the attribute of interest and input designating one statistical summary measure of validity, wherein the event processing engine is further configured to:

plot the value distribution for the attribute of interest in a graph in accordance with an XY coordinate system;

partition the X axis of the XY coordinate system in accordance with predefined temporal partitions of the temporal range;

for each partition of the X axis and summary measure, compute a color from a predefined color range using the relative ordering of the summary measures across the partitions; and for each said partition, fill the area between X axis and value distribution with the corresponding color.

22. The system of claim 21, wherein the event processing engine is further configured to label each partition with an associated summary measure value.

23. The system of claim 17, wherein the temporal range is updatable by a user.

24. The system of claim 17, wherein the updating of the temporal buffer comprises:

for an insert operation, inserting the respective element into the buffer, and removing older elements from the buffer if necessary to fit temporal range constraints;

for a remove operation, removing the respective element from the buffer; and for an update operation, removing the old element from the buffer followed by inserting the new element into the buffer.

25. The system of claim 17, wherein the computer system includes multiple caches and the first stream receives events only for a preselected one or more caches of the computer system.

26. The system of claim 17, wherein the calculating of the value distribution is performed in connection with a kernel function and a bandwidth strategy.

27. The system of claim 16, wherein:

the calculating of the value distribution is performed in connection with kernel density estimation and predetermined kernel function and bandwidth parameters, the predetermined kernel function parameter specifies Epanechnikow kernel functionality and a Normal Scale Rule is used for computing the bandwidth, and the Normal Scale Rule is updated each time an element enters or leaves the temporal buffer.

* * * * *